R. G. PARK, Jr.
SPRING WHEEL.
APPLICATION FILED JAN. 27, 1910.
1,207,993.
Patented Dec. 12, 1916.
2 SHEETS—SHEET 1.
FIG. I.
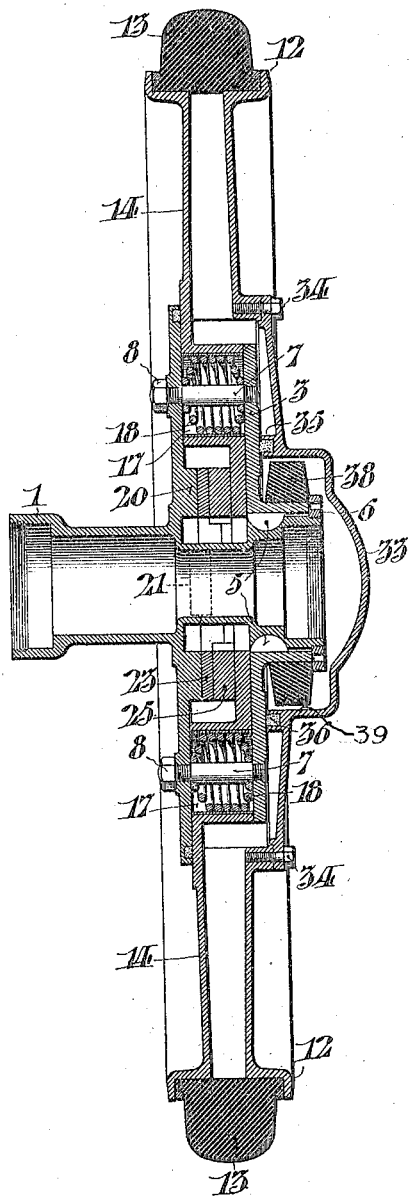
Inventor
Richard G. Park Jr.,
Witnesses

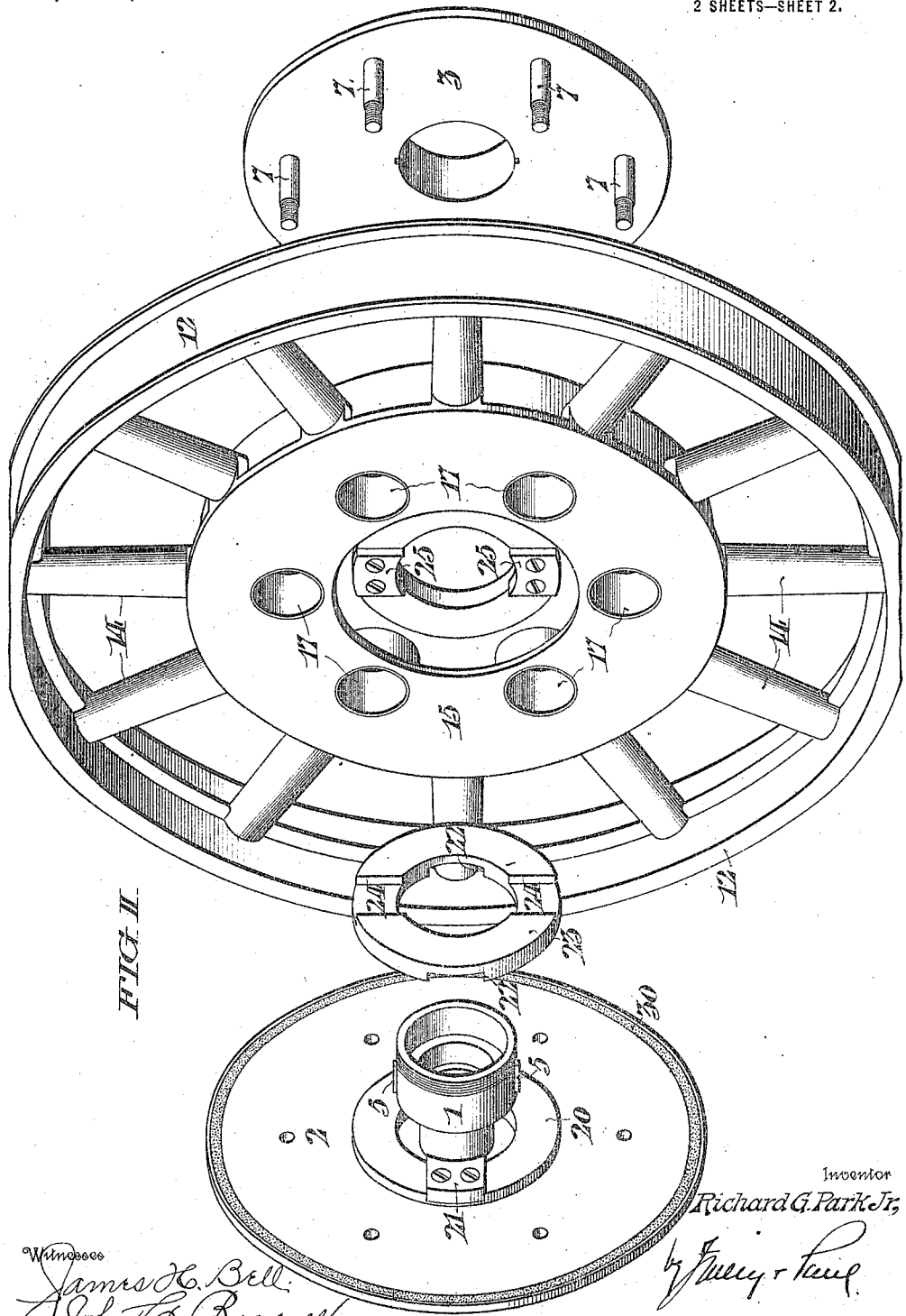

UNITED STATES PATENT OFFICE.

RICHARD G. PARK, JR., OF PHILADELPHIA, PENNSYLVANIA.

SPRING-WHEEL.

1,207,993.

Specification of Letters Patent. Patented Dec. 12, 1916.

Application filed January 27, 1910. Serial No. 540,309.

*To all whom it may concern:*

Be it known that I, RICHARD G. PARK, Jr., of Philadelphia, in the county of Philadelphia and State of Pennsylvania, have invented certain new and useful Improvements in Spring-Wheels, whereof the following is a specification, reference being had to the accompanying drawings.

My invention relates to a spring wheel, that is to say, a wheel in which the relation of the rim to the hub is not a fixed one, the two parts being capable of limited motion in relation to each other, subject to the control of powerful springs, whereby a cushioning effect is secured, similar to that obtained by a pneumatic rim.

According to my invention, the hub is provided with parallel disks in fixed relation to it, and between these disks the body of the wheel carrying spokes and rim, is confined with limited capacity for motion. A series of bolts which unite the opposing disks, pass through enlarged sockets in the body of the wheel, with interposition of powerful coiled springs, which cushion the body of the wheel in its relation to the hub. To steady the motion of these two parts in relation to each other, and afford a positive driving thrust between axle and rim, a universal sliding joint is interposed between the two by means of slideways arranged in rectangular relation.

Other novel and useful features of my invention, together with their functions will be adverted to in the description which follows.

In the accompanying drawings, Figure I, is a vertical section through the center of a wheel embodying my invention. Fig. II, is a view in perspective of the different parts making up the wheel sufficiently separated to show their structure.

In the drawings, a cylindrical hub 1, is shaped to receive the axle of a vehicle. As shown, it is conveniently arranged for the reception of ball-bearings as usually employed in connection with the wheels of motor vehicles. Integral with this hub is a flange or disk 2. A second collared disk 3, parallel to and concentric with disk 2, fits upon the outer end of the hub 1, with interposition of keys 5, and is clamped or secured thereon by a screw washer 6, adjustable upon the threaded outer extremity of the hub. The two parallel disks 2, and 3, are further accurately and adjustably spaced by a series of bolts 7, which, as shown, are set in disk 3, while their other extremities passing through holes in disk 2, are fixed therein by the nuts 8, screwing down on the threaded extremities of these bolts, and clamping the disk 2, between the nuts and suitable shoulders formed on the bolts.

The parts thus described are all fixed in relation to the hub, and in effect form part of the hub, rotating at all times with the hub truly upon the axle of the vehicle, and for convenience of phraseology, the portion of the wheel thus far described will be referred to as the hub portion. The remainder of the wheel, which may conveniently be termed the rim portion, comprises a rim 12, within which is set a tire 13, spokes 14, and a body portion 15, having a thickness suitable to be received between the disk 2, and 3, of the hub portion. This body portion is provided with sockets 17, passing directly through it, and so spaced as to permit the bolts 7, of the hub portion to pass centrally, one through each socket. Coiled springs 18, which may conveniently be formed of heavy metal wire coiled in the shape of a ball, as shown, rest snugly within each socket, with their central coils in contact therewith, while their extremities bear upon the bolt passing centrally through it, so that the entire rim portion is cushioned in its relation to the hub portion, subject to the constant tension of the combined action of the set of coiled springs, tending to maintain the two parts in such position as to center a bolt within each socket.

In order to relieve the coiled springs of any torsional strain due to employment of the axle of the vehicle wheel as a means of driving the wheel, I provide a driving collar, with slideways, forming what I term a universal joint, as follows: On the inner face of disk 2, is formed a flange 20, with projecting slide plates 21, which are received within a slideway 22, formed upon one face of a collar 23, which is interposed between the flange 20, and the opposing face of the body of the rim portion of the wheel. Similar slide plates 25, are attached to this part of the body, and are received within a slideway 24, on the opposite face of the collar 23, and which is at right angles to the slideway 22.

To protect the sliding surfaces and other parts from dirt and dust, a packing ring 30, is interposed between the disk 2, and the opposing face of the body, near the edge of the disk. A cover plate 33, fits upon the outside of the wheel completely protecting this side. It is bolted to the body beyond the edge of the disk 3, by bolts 34. It possesses an interiorly projecting flange 35, which reaches to the surface of the disk 3, with interposition of a packing ring 36. A heavy rubber ring 38, surrounds the outwardly projecting collar of the disk 3, and when the body of the wheel moves in relation to the hub portion, the ring comes into contact with a shoulder 39, formed on the cover plate 33, and limits the motion, adding its elastic force to that of the springs 18, to centrally cushion the rim portion of the wheel in relation to the hub portion.

I claim:—

A wheel comprising a hub portion, parallel disks and a rim portion, the body of the rim portion being received between the disks of the hub; the body of the rim portion having sockets formed therein; bolts uniting the disks of the hub and passing through said sockets; springs interposed between the sockets and the bolts, whereby one portion of the wheel is cushioned relative to the other, a collar interposed between said portions of the wheel, said collar having slideways at right angles to each other coöperating with projecting slide plates carried respectively by the hub portion and the rim portion of the wheel; an outside cover plate fastened to the rim portion and covering the entire end of the hub; and an elastic ring interposed between the end of the hub portion and the inside of the cover plate, with which said cover plate is adapted to contact to limit the relative movement between the two portions of the wheel.

In testimony whereof, I have hereunto signed my name, at Philadelphia, Pennsylvania, this twenty-second day of January, 1910.

RICHARD G. PARK, Jr.

Witnesses:
James H. Bell,
E. L. Fullerton.